(12) United States Patent
Mullarkey et al.

(10) Patent No.: US 9,979,607 B2
(45) Date of Patent: May 22, 2018

(54) DIAGNOSING ANOMALIES BASED ON DEVIATION ANALYSIS

(71) Applicant: CA, Inc., New York, NY (US)

(72) Inventors: Peter William Mullarkey, Fort Collins, CO (US); Kevin Eugene Davis, Cibolo, TX (US); Michael Charles Johns, Austin, TX (US)

(73) Assignee: CA, Inc., New York, NY (US)

( * ) Notice: Subject to any disclaimer, the term of this patent is extended or adjusted under 35 U.S.C. 154(b) by 242 days.

(21) Appl. No.: 14/745,781

(22) Filed: Jun. 22, 2015

(65) Prior Publication Data

US 2016/0373308 A1    Dec. 22, 2016

(51) Int. Cl.
*H04L 12/24* (2006.01)
*H04L 29/08* (2006.01)
*H04L 12/26* (2006.01)

(52) U.S. Cl.
CPC .......... *H04L 41/142* (2013.01); *H04L 43/045* (2013.01); *H04L 43/065* (2013.01); *H04L 67/36* (2013.01)

(58) Field of Classification Search
None
See application file for complete search history.

(56) References Cited

U.S. PATENT DOCUMENTS

| | | | |
|---|---|---|---|
| 6,473,659 B1 * | 10/2002 | Shah | G06F 11/2242 382/141 |
| 7,191,364 B2 | 3/2007 | Hudson et al. | |
| 7,203,624 B2 | 4/2007 | Warshawsky | |
| 8,000,935 B2 | 8/2011 | Logan | |
| 9,455,887 B1 * | 9/2016 | Upadhyay | H04L 43/50 |
| 2006/0167866 A1 * | 7/2006 | Farchi | G06F 11/3604 |
| 2007/0005545 A1 * | 1/2007 | Maddox | G06N 5/048 706/47 |
| 2007/0061443 A1 * | 3/2007 | Chavda | H04L 12/2602 709/224 |
| 2008/0250497 A1 * | 10/2008 | Mullarkey | H04L 41/142 726/22 |
| 2008/0301076 A1 * | 12/2008 | Timmins | G06Q 10/06 706/46 |
| 2010/0070462 A1 * | 3/2010 | Wada | G06F 11/0709 707/603 |
| 2010/0094992 A1 * | 4/2010 | Cherkasova | H04L 41/0896 709/224 |

(Continued)

*Primary Examiner* — Thomas Dailey
(74) *Attorney, Agent, or Firm* — Baker Botts L.L.P.

(57) ABSTRACT

A method for diagnosing system anomalies and presenting recommended solutions is described. The method comprises receiving current component performance data and historical component performance data regarding performance of a component of a multi-tier system. A baseline tier performance for each tier and a baseline component performance is determined. A cause of an anomaly in the performance of the component is determined by discovering deviations in current component performance data and current tier performance in compared to their baseline values. Based on these deviations, a recommended procedure for addressing the cause of the anomaly is determined. A display is formatted within a user interface of the recommended procedure for addressing the cause of the anomaly in the performance of the component.

14 Claims, 14 Drawing Sheets

(56) References Cited

U.S. PATENT DOCUMENTS

| | | | |
|---|---|---|---|
| 2014/0012562 A1* | 1/2014 | Chang | G06F 11/3461 703/22 |
| 2015/0138989 A1* | 5/2015 | Polehn | H04W 24/02 370/241 |
| 2015/0199148 A1* | 7/2015 | Hrischuk | G06F 3/0653 711/114 |
| 2015/0281008 A1* | 10/2015 | Kumar | H04L 43/16 709/224 |

* cited by examiner

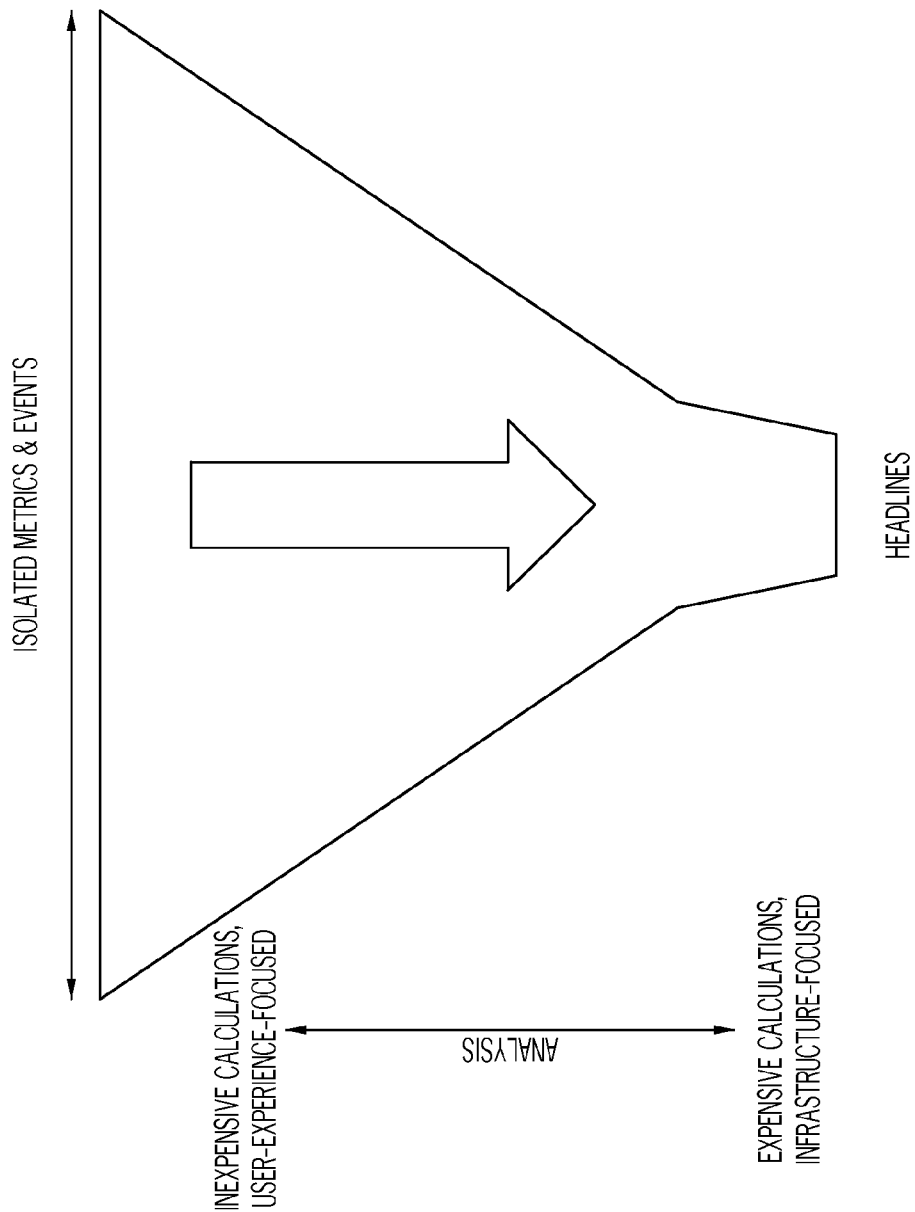

| SOURCE | PRIMARY INDICATORS | OBS | TREND | SECONDARY INDICATORS | OBS | TREND |
|---|---|---|---|---|---|---|
| NETWORK | COMPONENTS: NRTT | △ | ▽ | TRAFFIC: VOLUME/RATE | | |
| | SESSIONS: NETWORK CONNECTION TIME | △ | ▽ | QoS: SERVER BURSTINESS | | |
| | COMPONENTS: RETRANSMISSION TIME | △ | ▽ | SESSIONS: TCP/IP SESSION COUNTS | | |
| | | | | | | |
| SERVER | COMPONENTS: SERVER RESPONSE TIME | △ | △ | SESSIONS: UNRESPONSIVE/REFUSED CONNECTIONS | | △ |
| | SESSIONS: SERVER CONNECTION TIME | △ | △ | SESSIONS: TCP/IP SESSION COUNTS | | △ |
| | | | | TRAFFIC: VOLUME/RATE | | △ |
| | | | | QoS: SERVER BURSTINESS | | △ |
| APPLICATION | COMPONENTS: DATA TRANSFER TIME | ▽ | ▽ | QoS: SERVER BURSTINESS | | |
| | RESPONSE SIZE: DATA TRANSFER BY SIZE | | | TRAFFIC: VOLUME/RATE | | |
| | | | | SESSIONS: TCP/IP SESSION COUNTS/TIMES | | |

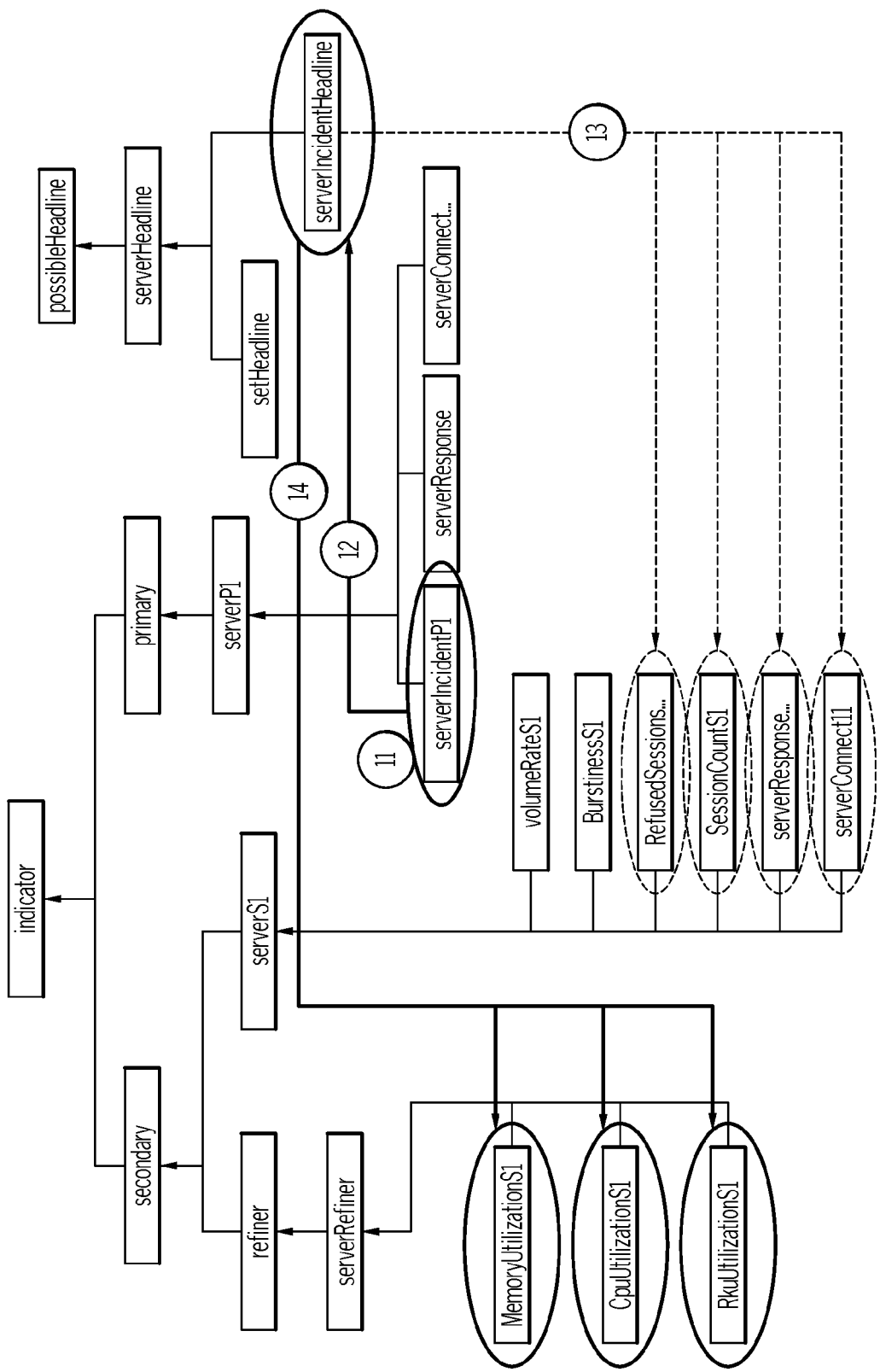

| Reports | Maps | Analysis | Items | Admin | | Help|Sign Out | Search 🔍 |

HL Incidents Group: / All Groups [change]
[Last Hour ▼] 25 May 2010 09:03 – 25 May 2010 10:03 CDT  
🖨PRINT ✉EMAIL  MORE ▼

Headlines for Server with Incidents                    2010-05-25 09:05 – 2010-05-25 10:05 CDT Headline ▼

A server incident issue happened for SUPSA82DISTPLAM at 5/25/10 2:30:00 PM and was supported by server response time and server connect time and server total sessions and refinement was provided by server memory utilization. The following indicators were checked and provided no date [server refused sessions and server Cpu utilization and server Nic utilization].

1 of 1                             Max Per Page: 10 ▼

Headline Details for Server SUPSA82DISTPLAM triggered by ServersWithIncident       2010-05-17 09:10 – 2010-05-17 10:10 CDT

| Server Name | Date of Issue | Trigger Metric | Secondary Indicators | Refinements for Cause | Indicators with no info |
|---|---|---|---|---|---|
| SUPSA82 DISTPLAM | 201005 251430 | 1.00 | server response time: 10.14 [metric:previousRecent:higher:1.00 metric:previousDay:higher:1.00 metric:previousWeek:higher:1.00 metricForPeers:previousRecentForPeers::NotAvailable obs:previousRecent:higher:1.00 obs:previousWeek:lower:1.00 metric:currentToBaseline:highPercentChange:1.00] server connect time: 0.00 [metric:previousRecent:lower:1.00 metric:previousDay:lower:1.00 metric:previousWeek:lower:1.00 metricForPeers:previousRecentForPeers::NotAvailable obs:previousRecent:higher:1.00 obs:previousWeek:lower:1.00 metric:currentToRecent::lowPercentChange:1.00] Server total sessions: 29.00 | Server memory utilization: 36.58 [metric:previousRecent:higher:1.00 metric:previousDay:lower:1.00 metric:previousWeek:lower:1.00 metricForPeers:previousRecentForPeers::NotAvailable obs:previousDay:higher:1.00 obs:previousWeek:higher:0.00 metric:currentToRecent::lowPercentChange:1.00] | server refused sessions server Cpu utilization server Nic utilization |

FIG. 8

DIAGNOSING ANOMALIES BASED ON DEVIATION ANALYSIS

BACKGROUND

The present disclosure relates to interfaces and, in particular, to a system, a computer program product, and method for diagnosing system anomalies and presenting recommended solutions in an interface.

SUMMARY

According to an embodiment of the present disclosure, a method is disclosed comprising receiving current component performance data and historical component performance data regarding performance of a component of a system, wherein the system comprises a plurality of tiers. The method further comprising determining a baseline tier performance of each tier of the plurality of tiers of the system, and determining a baseline component performance of the component based on the historical component performance data. The method further comprising determining a cause of an anomaly in the performance of the component. The method further comprising wherein determining the cause of the anomaly in the performance of the component comprises determining a first deviation between the current component performance data and the baseline component performance, and determining a second deviation between a current tier performance of a tier of the plurality of tiers and the baseline tier performance of the tier. The method further comprising determining a recommended procedure for addressing the cause of the anomaly in the performance of the component based on the first deviation and the second deviation. The method further comprising formatting for display within a user interface the recommended procedure for addressing the cause of the anomaly in the performance of the component.

According to another embodiment of the present disclosure, a processing system configured to perform the aforementioned method.

According to another embodiment of the present disclosure, a computer program product comprising a computer-readable storage medium having computer-readable program code embodied therewith, the computer-readable program comprising computer-readable program code configured to perform the aforementioned method.

Other objects, features, and advantages will be apparent to persons of ordinary skill in the art in view of the following detailed description and the accompanying drawings.

BRIEF DESCRIPTION OF THE DRAWINGS

For a more complete understanding of the present disclosure, needs satisfied thereby, and the objects, features, and advantages thereof, reference now is made to the following description taken in connection with the accompanying drawings. Embodiments of the present disclosure, and their features and advantages, may be understood by referring to FIGS. 1-14, like numerals being used for corresponding parts in the various drawings.

FIG. 2 is a schematic representation of a general overview of a non-limiting embodiment of the present disclosure.

FIG. 3 is a schematic depiction of a relationship between observations and trends of components in accordance with a non-limiting embodiment of the present disclosure.

FIG. 5 illustrates a diagnostic report containing ranked conclusions in a non-limiting embodiment of the present disclosure.

FIG. 7 illustrates a headliner server domain model in a non-limiting embodiment of the present disclosure.

FIG. 8 illustrates a diagnostic report containing a server incident report in a non-limiting embodiment of the present disclosure.

DETAILED DESCRIPTION

Figure 1:
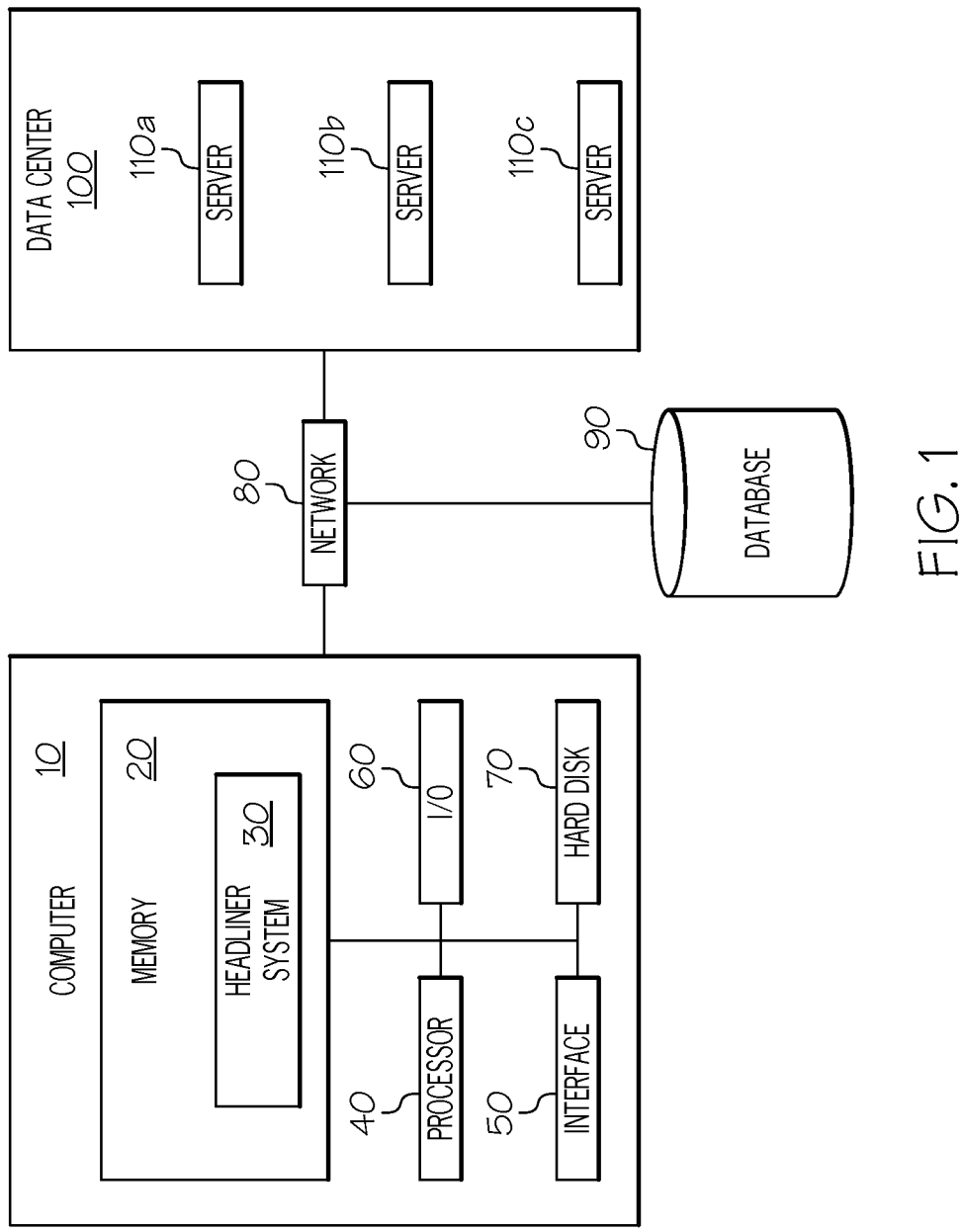
FIG. 1 illustrates a headliner system ecosystem in a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The goal of anomaly detection is to discover patterns in system data that do not conform to expected system behavior. Anomalies in system data often translate to significant issues in the system. A change in the performance of a system component, such as, for example, an increase in the utilization of a server system, may indicate a virus mining server resources for sensitive information.

However, the present anomaly detection systems do not go beyond an alarm system for an anomaly. Clients may be aware of an anomaly, but they may not actually understand the underlying issues. These systems fail provide a diagnosis or submit an action plan to the client for swift resolution of the system issue. Moreover, customers often lack the knowledge to bridge the gap between an anomaly alert and an appropriate resolution. In addition, current anomaly detection systems fail to analyze resources such as system architecture and peer systems.

Accordingly, there is a need in the marketplace for a client-friendly anomaly detection system designed to improve usability and efficiency by providing the necessary decision support and focused problem solving. The present disclosure describes a system that intuitively illustrates system performance and provides a recommended course of action for resolving issues unearthed by system anomalies. The headliner system is a multi-source analysis engine, driven by structured domain models that provides graph based encoding of domain knowledge. In other words, this system receives data from several sources, refines the data, and produces actionable knowledge for the client. The headliner system may analyze several data sources in comparison with a device of interest to determine an anomaly. The headliner system summarizes information about the device of interest and determines a ranked set of probable causes addressing the anomaly. Furthermore, the headliner system determines recommended steps or actions to resolve any system issues arising from anomaly detection.

From an efficiency standpoint, the current disclosure empowers the client with multiple effective solutions to system issues, bridging the knowledge gap between an anomaly alert and an action plan. Embodiments of the present disclosure can address the above problems, and other problems, individually and collectively.

FIG. 1 illustrates a headliner system ecosystem in a non-limiting embodiment of the present disclosure. The headliner system ecosystem may include a computer 10, a memory 20, a headliner system 30, a processor 40, an interface 50, an input and output ("I/O") device 60, and a hard disk 70. Headliner system 30 analysis may take place on the computer 10 shown in FIG. 1. Processor 40 may be operable to load instructions from hard disk 70 into memory 20 and execute those instructions. Memory 20 may store computer-readable instructions that may instruct the computer 10 to perform certain processes. I/O device 60 may receive one or more of data from a server or a network 80. The computer 10 may be considered a processing system. Furthermore, headliner system 30 analysis may take place on any processing system, wherein the processing system comprises one or more processors.

Network 80 may comprise one or more entities, which may be public, private, or community based. Network 80 may permit the exchange of information and services among users/entities that are connected to such network 5. In certain configurations, network 80 may be a local area network, such as an intranet. Further, network 80 may be a closed, private network/cloud, in certain configurations, and an open network/cloud in other configurations. Network 80 may facilitate wired or wireless communications of information and provisioning of services among users that are connected to network 80.

The headliner system ecosystem may also include a data center 100 which may include, for example, servers 110*a*, 110*b*, and 110*c*. The headliner system 30 may receive primary and secondary indicators of the servers 110*a*, 110*b*, and 110*c*. The headliner system 30 may also store historical performance of these servers on a database 90. Furthermore, the headliner system 30 may store any analysis, comments, headlines, or any data on the database 90.

The headliner system 30 may also refer to a database for an appropriate headliner for server analysis, such as, for example, comparing current recommended steps to prior recommended steps. By making this comparison, the headliner system 30 is able to determine if the current data analysis is similar to prior data analysis, and accordingly adjust a recommended solution. The headliner system 30 may also examine and compare current causes of anomalies with previous causes of anomalies and how they were addressed. Furthermore, the headliner system 30 may implement in a system a recommended procedure for addressing a cause of an anomaly or issue.

Furthermore, headliner system 30 may store data regarding the effectiveness and accuracy of each recommended solution. In other words, headliner system 30 may keep track of which recommended procedures are initiated by the client and the procedure's efficacy in addressing an anomaly. By collecting such data, the headliner system 30 may accordingly adapt recommended procedures to better suit client needs.

FIG. 2 is a schematic representation of a general overview of a non-limiting embodiment of the present disclosure. The present disclosure describes a headliner system 30 to improve communication between, for example, the underlying computer system and a technical associate of a client. FIG. 2 is an illustration depicting the overall strategy of the headliner system 30. The headliner system 30 analyzes isolated metrics and events within the system. The headliner system 30 may complete numerous inexpensive calculations regarding the user-experience of the system. Furthermore, the headliner system 30 may determine from these inexpensive calculations which infrastructure-focused calculations are required. The headliner system 30 may communicate a diagnostic report of status of the system in simple linguistics or natural language, referred to as headlines.

The gathered information may be transformed into a set of assertions about the device of interest. The headliner system 30 may then draw conclusions given the data and the context. For example, when a mail server's response time is found to be highly degraded, an alert notifies the system administrator. The headliner system 30 notices that the mail server's server response is much higher than yesterday, but similar to last week. The headliner system 30 also notices that the mail server's session count is moderately high, higher than yesterday, but still similar to last week. The headliner system 30 may then provide a headline for the system administrator stating that the mail server is having a weekly surge in activity that is degrading its responsiveness. Next, the headliner system 30 may provide a recommendation stating that the system administrator should consider updating if this surge is business critical. Furthermore, given a set of conditions and analysis results, the headlines provided may be more detailed. Based on the given set of conditions and analysis results, a headline may state that the mail server is overloaded due to a lack of memory resources. Thus, the headliner system 30 provides, in natural language, a directly actionable result and recommended procedure.

FIG. 3 is a schematic depiction of a relationship between observations and trends of components in accordance with a non-limiting embodiment of the present disclosure. The observations of primary and secondary indicators illustrate current usage of certain components of the system. For example, primary indicators such as server response time and connection setup time may be slowed by an increase in the number of sessions and requests (where session counts and session requests are secondary indicators for servers). In such a case, the server may be overtaxed and have difficulty responding to new session requests. If the trend is downward, the system may be bogged down due to high network usage. Additional secondary indicators for servers may include network connection time and data transfer response time. Secondary indicators may be based on network performance and condition. When demonstrating stress in the system, secondary indicators may indicate impact on the users accessing the server based on network conditions. The headliner system 30 relies on secondary indicators to refine its analysis of a computer system. Furthermore, the headliner system 30 may make assertions about secondary indicators and also about peers (e.g., other servers in a farm, other networks in a subnet, etc.).

Figure 4:
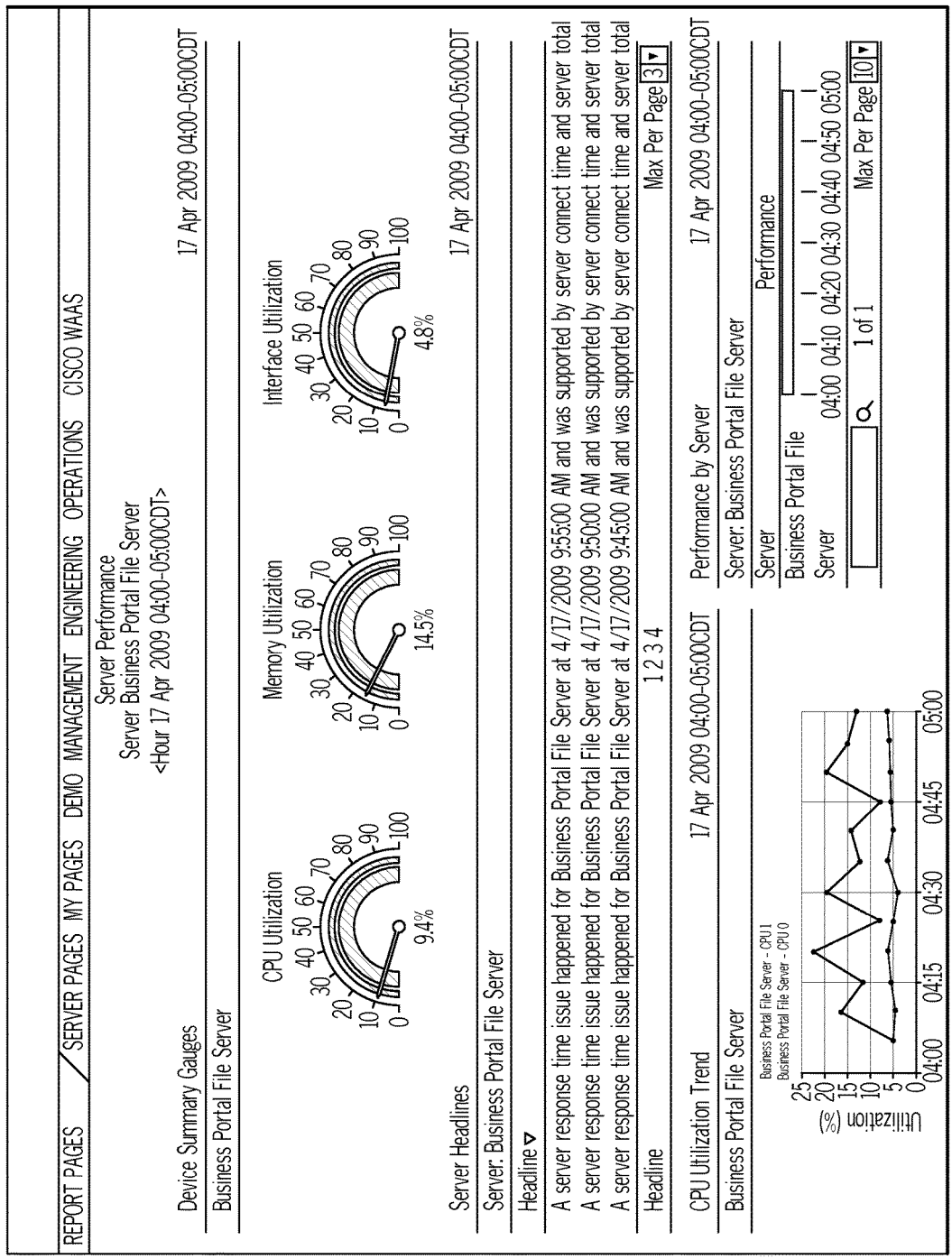
FIG. 4 illustrates a diagnostic report interface in accordance with a non-limiting embodiment of the present disclosure.

FIG. 4 illustrates a diagnostic report interface in accordance with a non-limiting embodiment of the present disclosure. The diagnostic report interface may include device summary gauges analyzing CPU utilization, memory utilization, and interface utilization. Further, the diagnostic report interface may include gauges analyzing performance of any component or tier of a system or peer system. Moreover, the diagnostic report interface is designed to be intuitive and clear. The diagnostic report interface also includes headliners describing in simplistic language abnormalities that may require the client's attention. The diagnostic report interface may also depicts the percentage of CPU utilization versus time. With this interface, the client is better able to monitor a server's performance in real-time and address issues should they arise.

Figure 5:
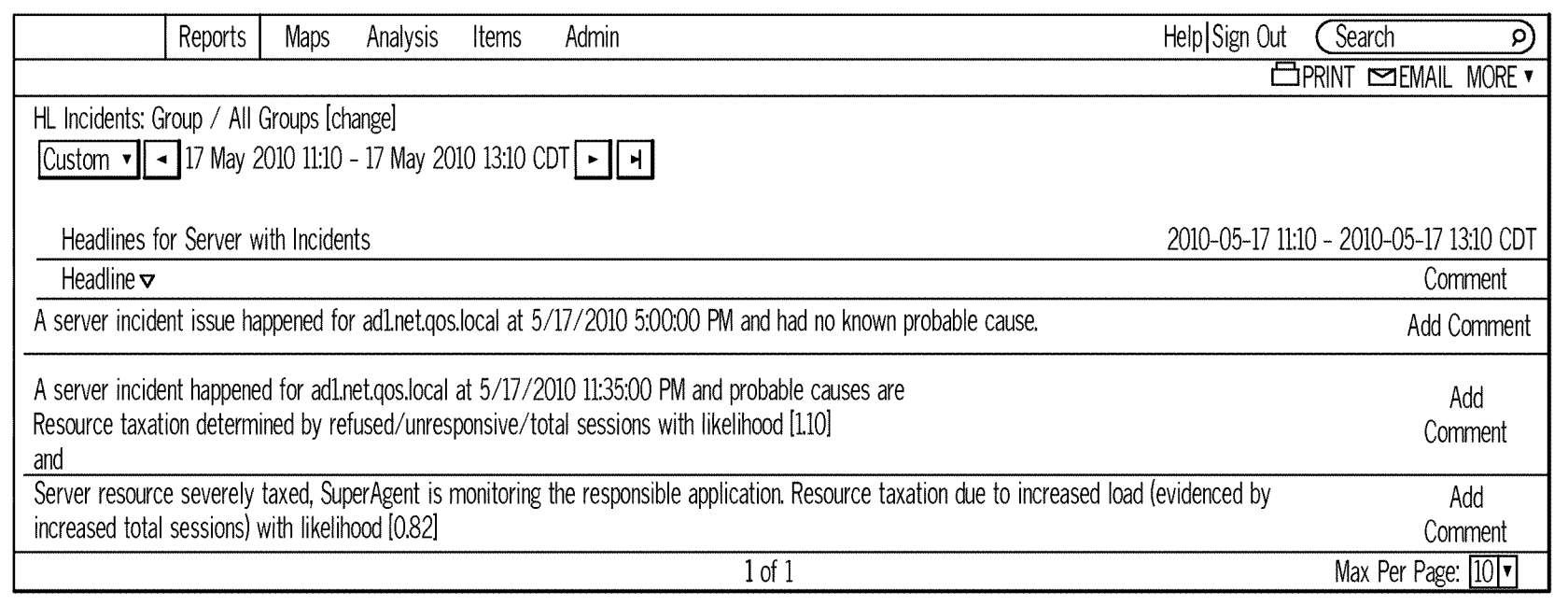

FIG. 5 illustrates a diagnostic report containing ranked conclusions in a non-limiting embodiment of the present disclosure. The headliner system 30 may determine an anomaly indicating an error in the system. This determination may be a result of analyzing several sources of data. One source of data may be the historical performance of all components of the server. The headliner system 30 may also compare the current performance of the present system with an analogous peer system. Furthermore, the headliner system 30 may consider this comparison in determining a recommended procedure for addressing a cause of an anomaly. The headliner system 30 may store historical performance data and peer performance data in a database or network/cloud.

By analyzing past and peer performance data, the headliner system 30 is able to determine a baseline of performance for components of the server. A baseline may be, for example, a range, an average, a standard, an inherent boundary, a default setting, a custom design, etc. If the baseline comprises high and low performance thresholds of a server system, the headliner system 30 may analyze the server system to determine if a spike in performance or utilization is commonplace or anomalous. Using the comment/suggestion system, the headliner system 30 may adapt to the system context of clients. In other words, the headliner system 30 may examine the performance behaviors of a client's system to determine if system performance is an anomaly in a certain context.

For example, the headliner system 30 may see a change in performance on the fifteenth of every month. This change in performance may be, for example, a spike in utilization on the fifteenth of every month. If the change in performance is significant, such as, for example, above the average threshold, the headliner system 30 may report a headline to the client indicating the server performance, the cause, and ranked conclusions. As such, the headliner system 30 may examine the temporal context of any current activity of a system and compare the current temporal context to previous system activity of similar temporal context. The client may add a comment to indicate that on the fifteenth of every month, the client completes payroll. Upon updating the headliner system 30, the headliner system 30 may incorporate the suggestion and adapt such that when server utilization spikes on the fifteenth of next month, the headliner system 30 considers such behavior as non-anomalous, or normal. In other words, the client's comments may be incorporated into the headliner system 30 in order to any baselines or thresholds for anomalous behavior.

In addition to past performance data of the system at issue, the headliner system 30 may examine diagnostic settings of the system. The headliner system 30 may, for example, determine whether there is a sole server or if there is an array of servers in the system. Additionally, the headliner system 30 may, for example, examine data from peer systems comprising analogous components. The headliner system 30 may use such analysis to determine, in a holistic manner, whether an anomaly indicates a system issue. Furthermore, the headliner system 30 may have an object structure instead of compiled code. As a result, the headliner system 30 may be extended by specialization or include additional metrics and attributes.

Each headline or recommended procedure may be ranked according to likelihood, with the most probable explanation at the top. Furthermore, each headline may be ranked according to any metric. A metric may be, for example, a metric of likelihood, standard range, condition, potential effectiveness, reliability, historical performance, etc.

Client feedback may also be taken into account by the headliner system 30 to adapt the headlines to increase accuracy. For example, the client may indicate that a certain headliner or recommended procedure is inaccurate. The headliner system 30 may incorporate the client's feedback into its analysis and ranking of recommended solutions. All feedback may be stored in a database 90 accessible by the headliner system 30. Feedback may also be tagged to the recommended solution so the headliner system 30 can adapt according to the client's suggestions. The 'add comment' shown in FIG. 5 is a non-limiting embodiment of the present disclosure. Feedback may occur in a 'thumbs up' and 'thumbs down' format to indicate accuracy or preference of the headlines. Feedback may be in any suitable manner. Furthermore, the client may provide feedback for any part of the headliner system 30.

Figure 6:
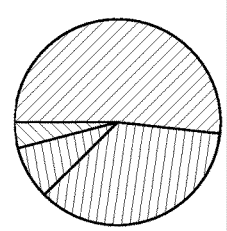
FIG. 6 illustrates a diagnostic report containing correlated anomalies in a non-limiting embodiment of the present disclosure.

FIG. 6 illustrates a diagnostic report containing correlated anomalies in a non-limiting embodiment of the present disclosure. This report provides the client with a wide view of their system by indicating enterprise-wide anomalies. The information provided in the diagnostic report empowers the client to recognize anomaly across the whole system. Furthermore, the headliners may describe each anomaly in a simple manner with a probable cause and a recommended procedure for resolution. Additional support may also be provided to work with the client to increase system comprehension and adapt the system to the client's needs.

FIG. 7 illustrates a headliner server domain model in a non-limiting embodiment of the present disclosure. In the domain model there are several indicators the headliner system 30 may take into account during processing probable causes of anomalies. Gauges 11 and 12 may act as a trigger to alert the headliner system 30 that there is an anomaly. When the headliner system 30 receives an alert, the system may seek out data from primary (gauge 14) and secondary (gauge 13) indicators to analyze the situation. After collecting data from the primary and secondary indicators relative to the problem, the headliner system 30 may continue with historical and peer comparisons, or any other applicable analysis, before presenting a diagnosis in the form of a headliner.

FIG. 8 illustrates a diagnostic report containing a server incident report in a non-limiting embodiment of the present disclosure. FIG. 8 illustrates how the headliner system 30 may react when some indicators are unavailable. The headline may specify that the indicators provided no data. Furthermore, the headline details for the server may indicate any indicators that provide no information.

Figure 9:
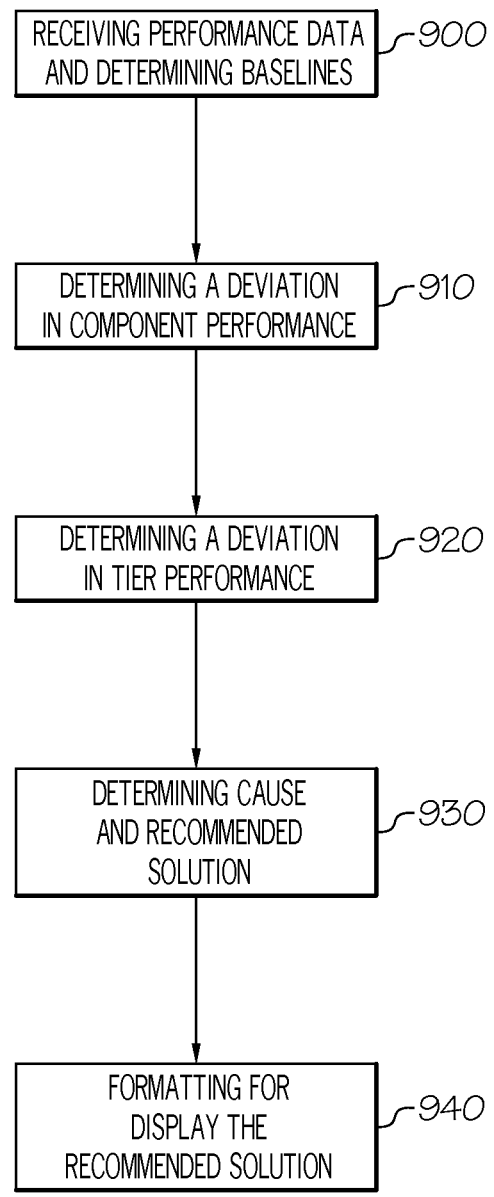
FIG. 9 illustrates a flow diagram depicting the process of a headliner system in a non-limiting embodiment of the present disclosure.

FIG. 9 illustrates a flow diagram depicting the process of a headliner system 30 in a non-limiting embodiment of the present disclosure. In step 900, the headliner system 30 may receive performance data from the system. Performance data may include responsiveness, utilization, processing, server response, interface utilization, CPU utilization, etc. The headliner system 30 may receive any type of data from a component of the system, such as, for example, historical and current performance data. Furthermore, the headliner system 30 may receive and analyze any data, such as, for example, performance or utilization data, from a system or a peer system, as well as any data related to an anomaly in either system. The headliner system 30 may also receive peer performance data for an analogous component in a peer system. Additionally, the headliner system 30 may receive performance of each tier of a plurality of tiers of the system. Headliner system 30 may also receive peer performance data for an analogous tier in a peer system.

In step 910, the headliner system 30 may determine a first deviation between the current component performance data in the system and a baseline component performance, which may be determined by the headliner system 30 using historical component performance data. A baseline may be, for example, a range, an average, a standard, an inherent boundary, a default setting, a custom design, etc. Headliner system 30 may determine a recommended procedure for addressing a cause of an anomaly in the performance of the component based on the first deviation.

In step 920, the headliner system 30 may determine a second deviation between a current tier performance of a tier of the system and the baseline tier performance of the tier. The baseline tier performance of each tier of a plurality of tiers of the system may be determined by the headliner system 30 using historical tier data regarding performance of each tier. Headliner system 30 may determine a recommended procedure for addressing a cause of an anomaly in the performance of the component based on the second deviation.

In step 930, the headliner system 30 may determine the cause of the anomaly, whether the anomaly indicates an error in the system, and further recommend a solution for addressing the situation. In step 930, the headliner system 30 may display performance data and the recommended solution in an intuitive manner. Furthermore, headliner system 30 may display any performed analysis or examination of a system within a user interface. A recommended solution may be a recommended procedure for addressing the cause of an anomaly in the performance of a component based on any received information from the system, peer systems, or databases. For example, the solution or recommended procedure may be based on the first deviation and/or the second deviation. Furthermore, the solution or recommended procedure may be based on any comparison between any part of the system being analyzed by headliner system 30 and any historical data, baseline data, peer system data, etc.

In step 940, the headliner system 30 formats for display within a user interface the solution or recommended procedure to a user. The displayed solution is designed to be intuitive and clear. The interface may also include headlines describing in simplistic language abnormalities or anomalies that may require the client attention. With this interface, the client may easily monitor a system's performance in real-time and receive recommended solutions for any arising issues.

In some configurations, the quantification methods of the headliner system 30 may avoid crisp thresholds. Network behavior may not change significantly from one integer to the next. To account for this reality, the headliner system 30 may use quantification methods incorporating fuzzy logic. Fuzzy logic is a form of many-valued logic that deals with approximate, rather than fixed and exact reasoning. Using fuzzy logic, the headliner system 30 is equipped to handle the concept of partial truth or partial degradation of a system. For example, the headliner system 30 may quantify current component performance data of a system component using fuzzy logic, and format for display within a user interface the quantified current component performance data. Furthermore, the headliner system may incorporate fuzzy logic into any interaction with the user to clearly communicate inexact information.

Figure 10:
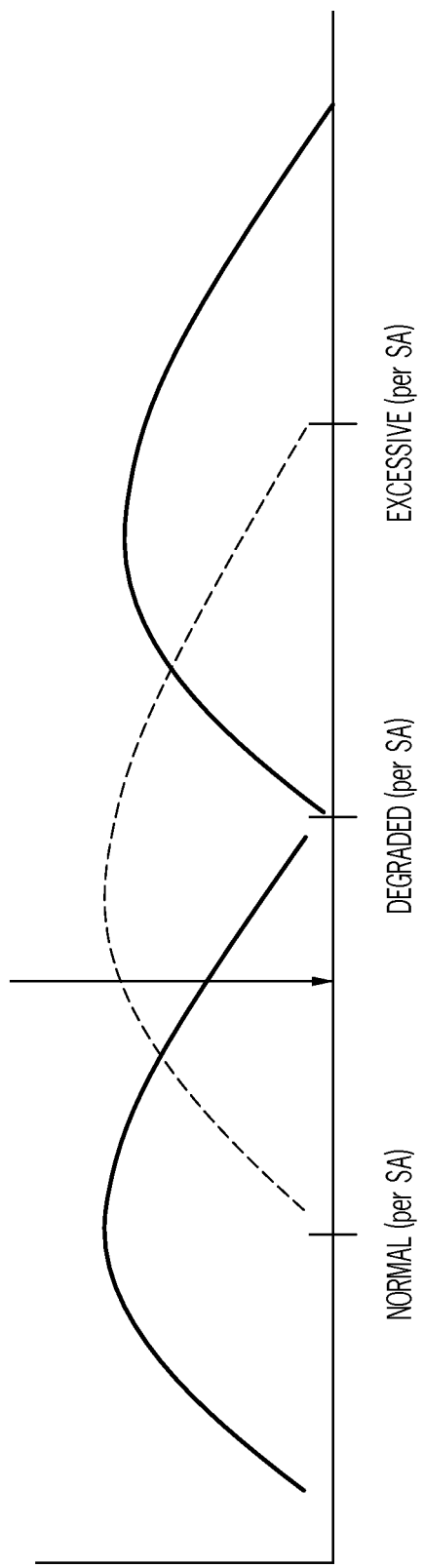
FIG. 10 is a depiction of fuzzy logic quantification in accordance with a non-limiting embodiment of the present disclosure.

FIG. 10 is a depiction of fuzzy logic quantification in accordance with a non-limiting embodiment of the present disclosure. The arrow represented in FIG. 10 depicts the system as partially degraded and partially normal (e.g., 80% degraded and 20% normal). For a user or controller of a system, it is useful to know the condition of the system in partial terms to better understand the state of the components of the system.

In some configurations, the headliner system 30 may also consider system architecture in determining a cause of an anomaly in the current performance of the system. For example, a system may consist of three tiers: a first tier, a second tier, and a third tier. Each tier, for example, may support the system in a different manner. For example, the first tier may be a web server, the second tier may be an application server, and the third tier may be a back-end database. A system may be structured to include any amount of tiers and any type of tiers. The headliner system 30 may monitor and analyze the current performance and/or historical performance of each tier in a multi-tiered system.

Figure 11:
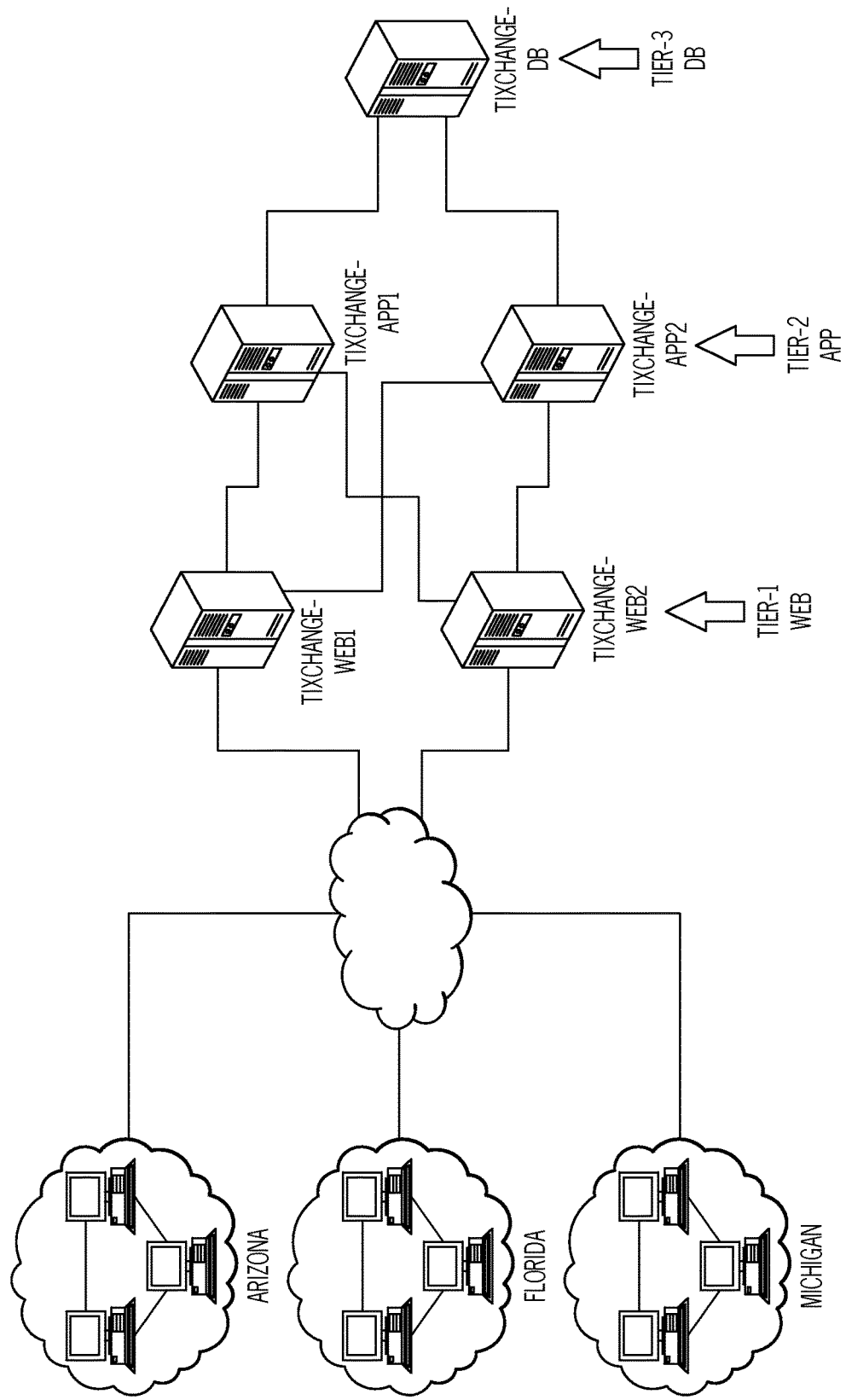
FIG. 11 is a schematic representation of a multi-tiered system ecosystem in accordance with a non-limiting embodiment of the present disclosure.

FIG. 11 is a schematic representation of a multi-tiered system ecosystem in accordance with a non-limiting embodiment of the present disclosure. Tier 1, Tier 2, and Tier 3 support the components of the system depicted in FIG. 11. Tier 1 may comprise, for example, several front end web servers. Tier 2 may comprise, for example, several application servers. Tier 3 may comprise, for example, one or more database servers. Although FIG. 11 only depicts three tiers, the headliner system 30 is capable of analyzing any amount of elements or servers within any amount of tiers.

To analyze a multi-tier system, the headliner system may determine a baseline performance of each tier of the system by, for example, monitoring and logging historical performance. After establishing a baseline performance for each tier, the headliner system 30 may determine whether a current performance of a tier deviates from the baseline performance of the tier. Such a deviation may be indicative of an issue within the system, such as, for example, an abnormality or an anomaly.

The headliner system 30 may dynamically gather information about each tier in a multi-tiered system. For example, if the server response time is high for both the first tier and the second tier but not the third tier, headliner system 30 may indicate that the server response problem domain is the second tier. Headliner system 30 may make this conclusion with an associated likelihood based on the strength of supporting assertions. Furthermore, headliner system 30 may compare this conclusion with other possible conclusions given the server response data for each tier. In addition, headliner system 30 may format for display a current server response time and a baseline server response time for each tier of a multi-tiered system. For example, regarding server response time (SRT), if SRT::metric::tier1::higher and SRT::metric::tier2::higher and SRT::metric::tier3::not:higher, then SRT::problemDomain::tier2. Furthermore, as another example, if SRT::metric::tier(n)::higher and SRT::metric::tier(n−1)::higher and SRT::metric::tier(n−2)::not:higher, then SRT::problemDomain::tier(n−1).

Figure 12:
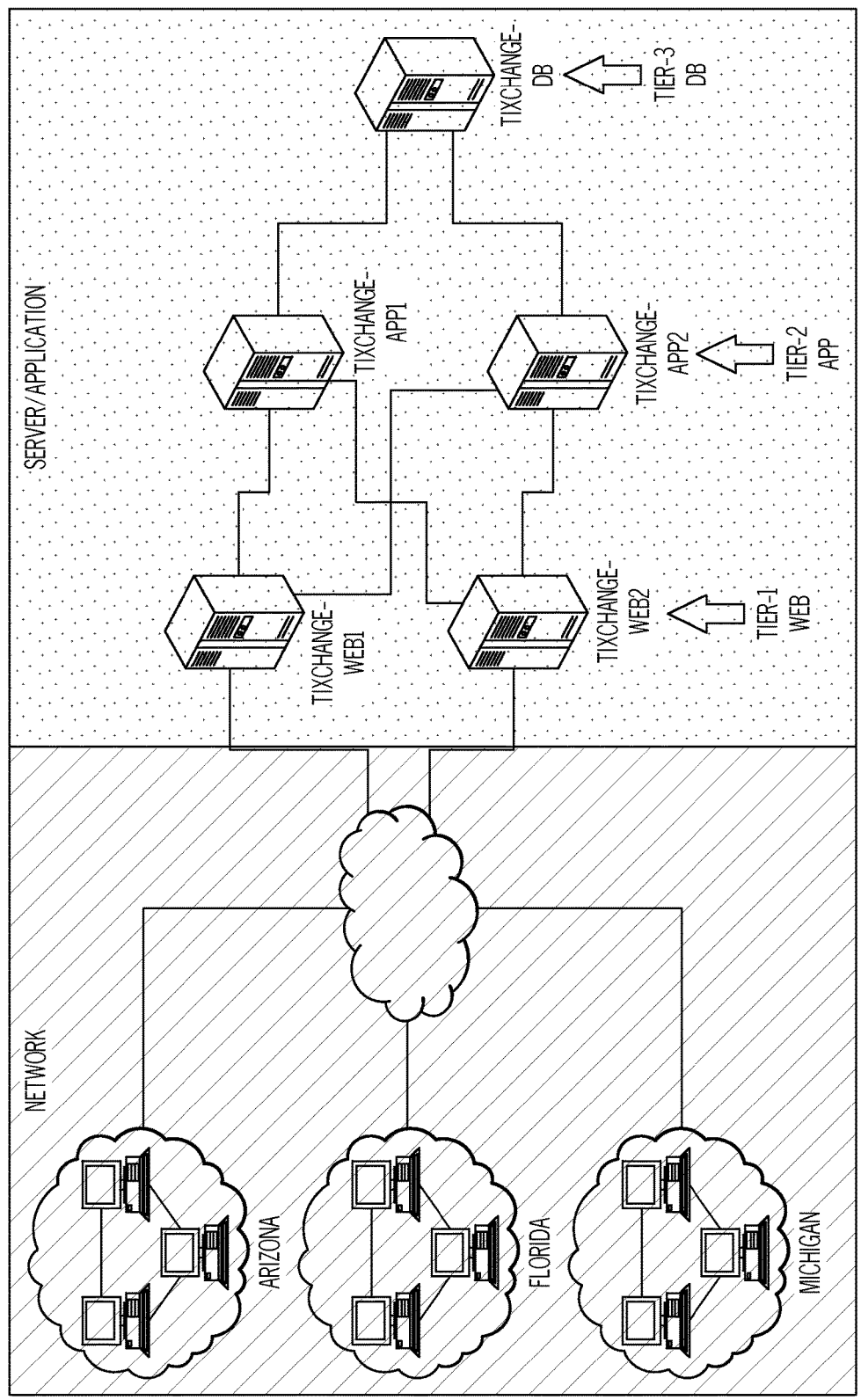
FIG. 12 is a schematic representation of a Tier 1 fault domain multi-tiered system ecosystem in accordance with a non-limiting embodiment of the present disclosure.
Figure 13:
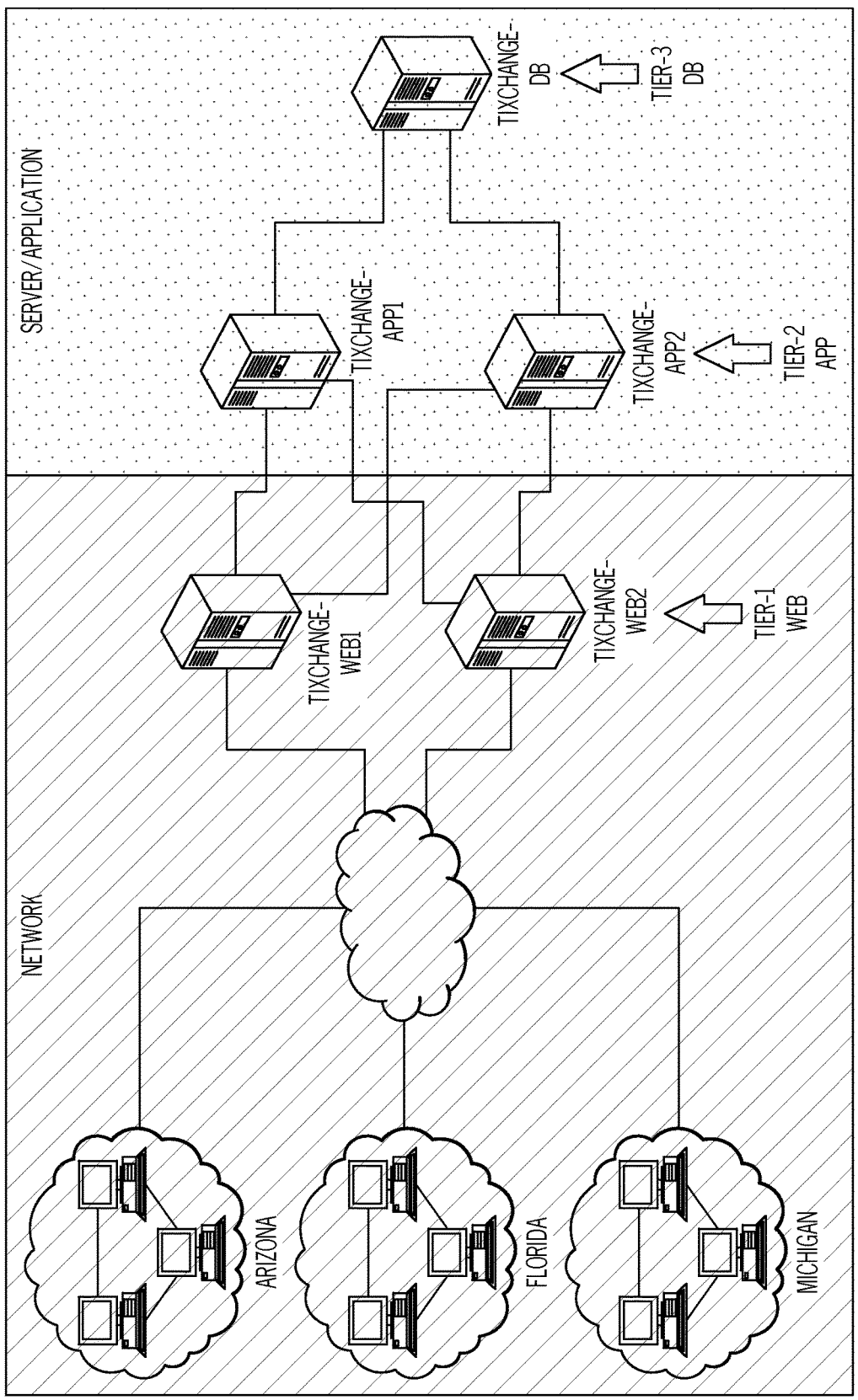
FIG. 13 is a schematic representation of a Tier 2 fault domain for a multi-tiered system ecosystem in accordance with a non-limiting embodiment of the present disclosure
Figure 14:
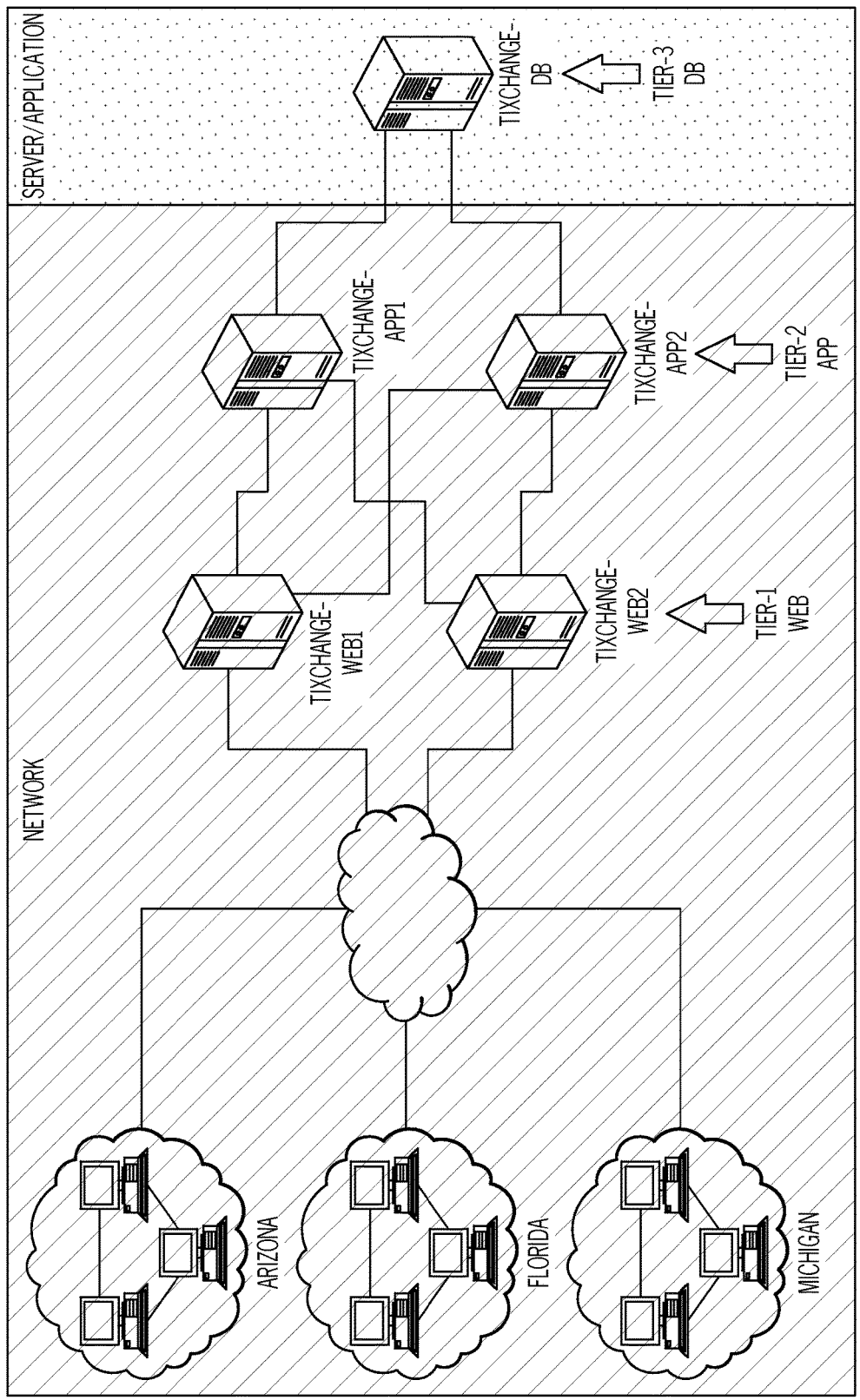
FIG. 14 is a schematic representation of a Tier 3 fault domain for a multi-tiered system ecosystem in accordance with a non-limiting embodiment of the present disclosure.

FIG. 12 is a schematic representation of a Tier 1 fault domain multi-tiered system ecosystem in accordance with a non-limiting embodiment of the present disclosure. In FIGS. 12-14, the dotted area indicates a tier or tiers that have an issue, and the lined area indicates a network of the system performing within a baseline, such as, for example, in a normal range. In FIG. 12, the dotted area includes Tier 1, Tier 2, and Tier 3. The headliner system 30 may, for example, examine primary and secondary indicators for each tier and determine the fault domain to be Tier 1. By resolving the issue in Tier 1, the issues in Tier 2 and Tier 3 may be resolved. As such, the headliner system 30 may indicate within a user interface a recommended procedure to resolve the issue in Tier 1.

FIG. 13 is a schematic representation of a Tier 2 fault domain for a multi-tiered system ecosystem in accordance with a non-limiting embodiment of the present disclosure. In FIG. 13, the dotted area includes Tier 2 and Tier 3. The headliner system 30 may, for example, examine primary and secondary indicators for each tier and determine the fault domain to be Tier 2. By resolving the issue in Tier 2, the issue in Tier 3 may be resolved. As such, the headliner system 30 may indicate within a user interface a recommended procedure to resolve the issue in Tier 2.

FIG. 14 is a schematic representation of a Tier 3 fault domain for a multi-tiered system ecosystem in accordance with a non-limiting embodiment of the present disclosure. In FIG. 14, the dotted area includes Tier 3. For example, the headliner system 30 may examine primary and secondary indicators for each tier and determine the fault domain to be Tier 3. By resolving the issue in Tier 3, the system issues may be resolved. As such, the headliner system 30 may indicate within a user interface a recommended procedure to resolve the issue in Tier 3.

In some configurations, the headliner system 30 may provide decision support for clientele. Decision support may assist the client in adapting the headliner system 30 to his or her specific needs. Decision support may be live, automated, a combination thereof, or in any suitable manner.

The figures illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

While the present disclosure has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It will also be understood by those of ordinary skill in the art that the scope of the disclosure is not limited to use in a server diagnostic context, but rather that embodiments of the invention may be used in any transaction having a need to monitor information of any type. The specification and the described examples are considered as exemplary only, with the true scope and spirit of the invention indicated by the following claims.

What is claimed is:

1. A method, comprising:
  receiving current component performance data and historical component performance data regarding performance of a component of a system, wherein the system comprises a plurality of tiers;
  determining a baseline tier performance of each tier of the plurality of tiers of the system;
  determining a baseline component performance of the component based on the historical component performance data;
  determining a cause of an anomaly in the performance of the component, wherein determining the cause of the anomaly in the performance of the component comprises:
    determining a first deviation between the current component performance data and the baseline component performance;
    determining a second deviation between a current tier performance of a tier of the plurality of tiers and the baseline tier performance of the tier;
    determining a third deviation between the current component performance data and component performance of an analogous component in a peer system;
  determining a recommended procedure for addressing the cause of the anomaly in the performance of the component based on the first deviation, the second deviation and the third deviation, wherein determining the recommended procedure for addressing the cause of the anomaly in the performance of the component further comprises determining a plurality of recommended procedures for addressing the cause of the anomaly in the performance of the component, the plurality of recommended procedures including the recommended procedure;
  receiving input regarding a select recommended procedure of the plurality of recommended procedures for addressing the cause of the anomaly in the performance of the component;
  adjusting a ranking of the select recommended procedure according to the input;
  formatting for display within a user interface the recommended procedure for addressing the cause of the anomaly in the performance of the component; and
  implementing in the system the recommended procedure for addressing the cause of the anomaly.

2. The method of claim 1, further comprising:
  quantifying current component performance data using fuzzy logic; and
  formatting for display within the user interface the quantified current component performance data.

3. The method of claim 1, wherein determining the recommended procedure for addressing the cause of the anomaly in the performance of the component further comprises:
  comparing the cause of the anomaly in the performance of the component to a prior cause of a prior anomaly in a database.

4. The method of claim 1, further comprising:
  determining that the anomaly in the performance of the component indicates an error in the system;
  receiving input regarding a context of the current component performance data; and
  adjusting the ranking of the recommended procedure according to the context, the ranking of the recommended procedure being a ranking among the plurality of recommended procedures for addressing the cause of the anomaly in the performance of the component.

5. The method of claim 1, further comprising:
ranking the recommended procedure among the plurality of recommended procedures for addressing the cause of the anomaly in the performance of the component, wherein the ranking is based on a metric of potential effectiveness for addressing the cause of the anomaly.

6. The method of claim 1, wherein determining the cause of the anomaly in the performance of the component further comprises:
comparing a temporal context of the current component performance data to a similar temporal context in the historical component performance data.

7. The method of claim 1, wherein formatting for display within a user interface further comprises:
formatting for display a server response time of each tier of the plurality of tiers; and
formatting for display the baseline tier performance of each tier of the plurality of tiers.

8. A system comprising:
a processing system comprising a processor configured to perform processes comprising:
receiving current component performance data and historical component performance data regarding performance of a component of a system, wherein the system comprises a plurality of tiers;
determining a baseline tier performance of each tier of the plurality of tiers of the system;
determining a baseline component performance of the component based on the historical component performance data;
determining a cause of an anomaly in the performance of the component, wherein determining the cause of the anomaly in the performance of the component comprises:
determining a first deviation between the current component performance data and the baseline component performance;
determining a second deviation between a current tier performance of a tier of the plurality of tiers and the baseline tier performance of the tier;
determining a third deviation between the current component performance data and the component performance of an analogous component in a peer system;
determining a recommended procedure for addressing the cause of the anomaly in the performance of the component based on the first deviation, the second deviation and the third deviation, wherein determining the recommended procedure for addressing the cause of the anomaly in the performance of the component further comprises determining a plurality of recommended procedures for addressing the cause of the anomaly in the performance of the component, the plurality of recommended procedures including the recommended procedure;
receiving input regarding a select recommended procedure of the plurality of recommended procedures for addressing the cause of the anomaly in the performance of the component;
adjusting a ranking of the select recommended procedure according to the input;
formatting for display within a user interface the recommended procedure for addressing the cause of the anomaly in the performance of the component; and
implementing in the monitored system the recommended procedure for addressing the cause of the anomaly.

9. The system of claim 8, wherein the processing system is configured to perform further processes comprising:
quantifying current component performance data using fuzzy logic; and
formatting for display within the user interface the quantified current component performance data.

10. The system of claim 8, wherein determining the recommended procedure for addressing the cause of the anomaly in the performance of the component further comprises:
comparing the cause of the anomaly in the performance of the component to a prior cause of a prior anomaly in a database.

11. The system of claim 8, wherein the processing system is configured to perform further processes comprising:
determining that the anomaly in the performance of the component indicates an error in the monitored system;
receiving input regarding a context of the current component performance data; and
adjusting the ranking of the recommended procedure according to the context, the ranking of the recommended procedure being a ranking among the plurality of recommended procedures for addressing the cause of the anomaly in the performance of the component.

12. The system of claim 8, wherein the processing system is configured to perform further processes comprising:
ranking the recommended procedure among the plurality of recommended procedures for addressing the cause of the anomaly in the performance of the component, wherein the ranking is based on a metric of potential effectiveness for addressing the cause of the anomaly.

13. The system of claim 8, wherein determining the cause of the anomaly in the performance of the component further comprises:
comparing a temporal context of the current component performance data to a similar temporal context in the historical component performance data.

14. A computer program product comprising:
a non-transitory computer-readable storage medium having computer-readable program code embodied therewith, the computer-readable program code comprising:
computer-readable program code configured to receive current component performance data and historical component performance data regarding performance of a component of a system, wherein the system comprises a plurality of tiers;
computer-readable program code configured to determine a baseline tier performance of each tier of the plurality of tiers of the system;
computer-readable program code configured to determine a baseline component performance of the component based on the historical component performance data;
computer-readable program code configured to determine a cause of an anomaly in the performance of the component, wherein determining the cause of the anomaly in the performance of the component comprises:
computer-readable program code configured to determine a first deviation between the current component performance data and the baseline component performance;
computer-readable program code configured to determine a second deviation between a current tier performance of a tier of the plurality of tiers and the baseline tier performance of the tier;
computer-readable program code configured to determine a third deviation between the current component performance data and component performance of an analogous component in a peer system;

computer-readable program code configured to determine a recommended procedure for addressing the cause of the anomaly in the performance of the component based on the first deviation, the second deviation and the third deviation, wherein determining the recommended procedure for addressing the cause of the anomaly in the performance of the component further comprises determining a plurality of recommended procedures for addressing the cause of the anomaly in the performance of the component, the plurality of recommended procedures including the recommended procedure;

computer-readable program code configured to receive input regarding a select recommended procedure of the plurality of recommended procedures for addressing the cause of the anomaly in the performance of the component;

computer-readable program code configured to adjust a ranking of the select recommended procedure according to the input;

computer-readable program code configured to format for display within a user interface the recommended procedure for addressing the cause of the anomaly in the performance of the component; and computer-readable program code configured to implement in the monitored system the recommended procedure for addressing the cause of the anomaly.

* * * * *